US010692612B2

(12) United States Patent
Kimura et al.

(10) Patent No.: US 10,692,612 B2
(45) Date of Patent: Jun. 23, 2020

(54) NUCLEAR REACTOR AND A METHOD OF HEAT TRANSFER FROM A CORE

(71) Applicant: KABUSHIKI KAISHA TOSHIBA, Minato-ku (JP)

(72) Inventors: Rei Kimura, Setagaya (JP); Taishi Yoshida, Yokohama (JP); Satoshi Wada, Kawasaki (JP); Yoshiro Nishioka, Yokohama (JP); Yoshihiro Hyodo, Kawasaki (JP); Kunio Hoshino, Sagamihara (JP); Ryosuke Miura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 141 days.

(21) Appl. No.: 15/666,152

(22) Filed: Aug. 1, 2017

(65) Prior Publication Data
US 2018/0033501 A1 Feb. 1, 2018

(30) Foreign Application Priority Data
Aug. 1, 2016 (JP) .................................. 2016-151201

(51) Int. Cl.
*G21C 15/12* (2006.01)
*G21C 15/06* (2006.01)
(Continued)

(52) U.S. Cl.
CPC .............. *G21C 15/12* (2013.01); *G21C 1/322* (2013.01); *G21C 3/22* (2013.01); *G21C 3/322* (2013.01);
(Continued)

(58) Field of Classification Search
CPC ...... G21C 15/12; G21C 15/257; G21C 15/06; G21C 1/322; G21C 3/22; G21C 3/322;
(Continued)

(56) References Cited

U.S. PATENT DOCUMENTS 3,104,219 A * 9/1963 Sulzer ...................... G21C 3/30
 376/455
3,284,176 A * 11/1966 Reed ...................... B23K 31/02
 428/450
(Continued)

OTHER PUBLICATIONS

King, "A methodology for the neutronics design of space nuclear reactors", In AIP Conference Proceedings, vol. 699, No. 1, pp. 319-329, AIP, 2004. (Year: 2004).*
(Continued)

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A nuclear device including a plurality of heat pipes; a first fuel configured to surround respective of the plurality of heat pipes coaxially with respect to a central axis of each of the respective heat pipes, the first fuel containing a fissile material at a first enrichment level; a second fuel configured to directly abut the first fuel on the outside of the first fuel and farther than the first fuel from the respective heat pipes surrounded by the first fuel, the second fuel containing the fissile material at a second enrichment level less than the first enrichment level; and a core including the heat pipes arranged in parallel with each other.

15 Claims, 13 Drawing Sheets

(51) Int. Cl.
  G21D 5/02      (2006.01)
  G21C 15/257    (2006.01)
  G21C 5/12      (2006.01)
  G21D 7/04      (2006.01)
  G21C 3/22      (2006.01)
  G21C 3/322     (2006.01)
  G21C 5/14      (2006.01)
  G21C 1/32      (2006.01)
  G21C 11/02     (2006.01)

(52) U.S. Cl.
  CPC ............... *G21C 5/12* (2013.01); *G21C 5/14* (2013.01); *G21C 15/06* (2013.01); *G21C 15/257* (2013.01); *G21D 5/02* (2013.01); *G21D 7/04* (2013.01); *G21C 11/02* (2013.01); *Y02E 30/38* (2013.01)

(58) Field of Classification Search
  CPC ... G21C 5/12; G21C 5/14; G21D 5/02; G21D 7/04
  USPC ............... 376/321, 367, 406, 435, 455, 903
  See application file for complete search history.

(56) References Cited

U.S. PATENT DOCUMENTS

| | | | |
|---|---|---|---|
| 3,960,655 A | | 6/1976 | Bohanan et al. |
| 4,689,195 A | * | 8/1987 | Aoyama ............... G21C 3/328 376/435 |
| 5,408,510 A | | 4/1995 | Ball et al. |
| 2003/0026380 A1 | * | 2/2003 | Anegawa ............... G21C 3/326 376/435 |
| 2016/0012924 A1 | | 1/2016 | McClure et al. |
| 2018/0144834 A1 | * | 5/2018 | Lebedev ............... G21C 15/04 |

OTHER PUBLICATIONS

Buden, "Summary of space nuclear reactor power systems", 1983-1992, INEL/MISC-93085, Idaho National Engineering Lab, 1993. (Year: 1993).*

El-Genk, "Conceptual Design of HP-STMCs Space Reactor Power System for 110 kWe", In AIP Conference Proceedings, vol. 699, No. 1, pp. 658-672, 2004. (Year: 2004).*

Koenig, "Heat pipe nuclear reactors for space applications", In 3rd International Heat Pipe Conference, pp. 391-397, 1977. (Year: 1977).*

Mason, "A small fission power system with Stirling power conversion for NASA science missions", NASA/TM-2011/217204 (2011). (Year: 2011).*

Patrick R. McClure, et al., "Design and Testing of Small Nuclear Reactors for Defense and Space Applications", Los Alamos National Laboratory, Invited Talk to ANA Trinity Section, LA-UR-13-27054, Sep. 20, 2013, 52 pages.

Patrick R. McClure, et al., "KiloPower Space Reactor Concept-Reactor Materials Study", Los Alamos National Laboratory, LA-UR-14-23402, May 14, 2014, 12 pages.

Rei Kimura, et al., "Design study of molten-salt-type reactor for powering space probes and its automated start-up", Journal of Nuclear Science and Technology, vol. 50, No. 10, 2013, 14 pages.

Mohamed S. El-Genk, "Deployment history and design considerations for space reactor power systems", Acta Astronautica, 64, 2009, 19 pages.

* cited by examiner

NUCLEAR REACTOR AND A METHOD OF HEAT TRANSFER FROM A CORE

CROSS-REFERENCE TO RELATED APPLICATIONS

The present application is based on and claims priority to Japanese Patent Application No. JP 2016-151201 filed Aug. 1, 2016, the entire contents of which are incorporated herein by reference.

BACKGROUND

Field

Embodiments relate to a small nuclear reactor used, for example, in space, on the moon, and polar regions of the earth.

Description of Related Art

Small nuclear reactors produce more energy per unit weight than other types of nuclear reactors. The small reactors have been used as power supplies in space for example. The small nuclear reactors include heat pipes which transmit heat generated in the core of the reactor to other parts in the reactor. The heat pipes transmit a large amount of heat per unit volume and do not need movable parts. The heat pipes with such a simple structure have realized simplification of the small nuclear reactors. The heat pipes without movable parts do not induce problems due to movable parts. Such heat pipes have improved reliability of the small nuclear reactors. In small nuclear reactors, a plurality of heat pipes with small diameter can be allocated in the cores.

SUMMARY

Present embodiments disclose a nuclear reactor including a heat pipe, a first fuel allocated around a side surface of the heat pipe parallel to a central axis of the heat pipe, the first fuel containing a fissile material as a first concentration, a second fuel allocated on an outer side of the first fuel and containing the fissile material at a second concentration smaller than the first concentration, and a core including a plurality of heat pipes arranged in parallel to each of the central axis in the first fuel or the first fuel and the second fuel.

BRIEF DESCRIPTION OF THE DRAWINGS

A more complete appreciation of embodiments and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Hereafter, embodiments are described with reference to the drawings. An overview of a small nuclear reactor is described with reference to FIG. 1 and FIG. 2. The small nuclear reactor 1 shown in FIG. 1 is a small nuclear reactor used as a power generator, for example, in space, on the moon, on Mars, at polar regions on the earth, etc.

In a small nuclear reactor, the acceptable highest temperature in a core is predetermined based on heat resistance of the reactor's structure. For example, in a small nuclear reactor including metal hydride, the acceptable highest temperature in a core is less than the hydrogen dissociation temperature to prevent hydrogen dissociation. Heat generated near the heat pipes transfers to the heat pipes easily and contributes to energy output of the reactor. On the other hand, heat generated relatively farther from the heat pipes is more difficult to transfer to the heat pipes and contributes less to energy output of the reactor. As a result, the temperature farther from the heat pipes in the core is higher than at the other parts in the core nearer the heat pipes. To maintain the temperature at parts farther from the heat pipes to be cooler than the predetermined temperature, the core temperature as a whole needs to be lowered. This means the energy outputted by the reactor has been restricted to maintain the temperature farther from the heat pipe cooler than the predetermined temperature.

In the small nuclear reactor device 1 described in this embodiment, a rise in local temperature is prevented and the output energy from the reactor is improved.

Figure 1:
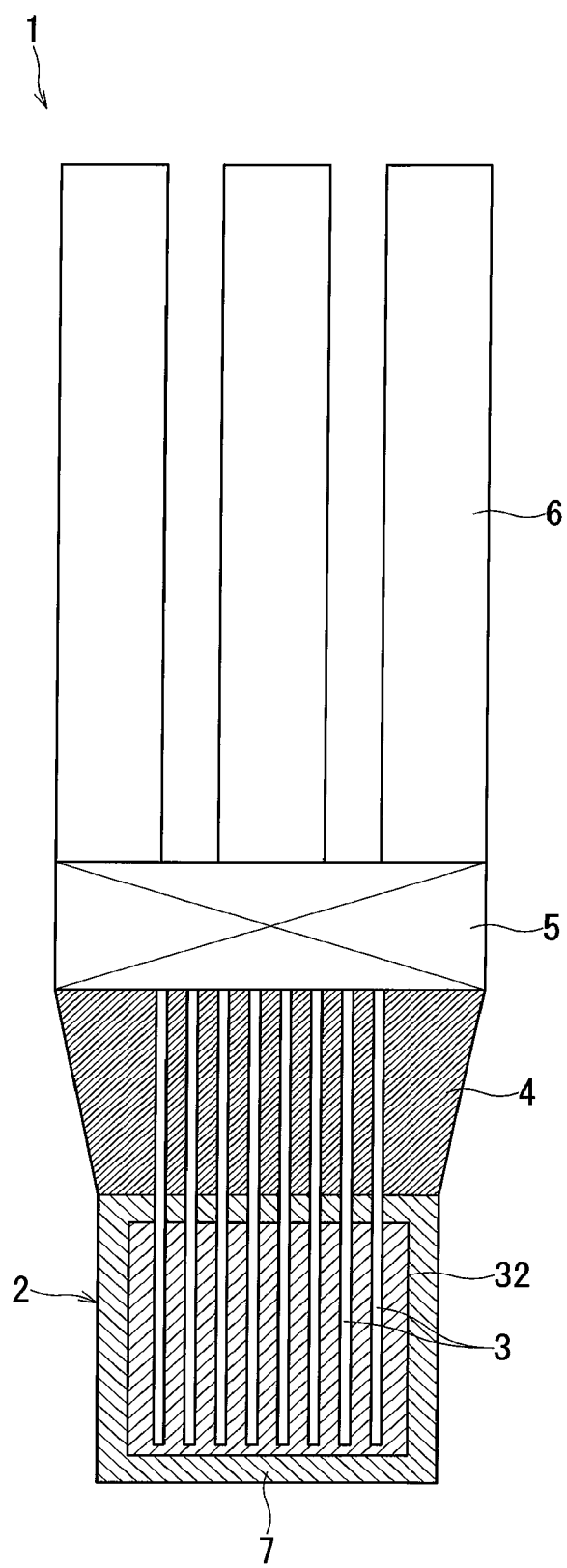
FIG. 1 is a schematic view of a nuclear power generator of a first embodiment.

As shown in FIG. 1, the small nuclear reactor device 1 includes a nuclear reactor 2 containing nuclear fuel, a plurality of heat pipes 3 transferring heat generated by fission of the nuclear fuel in the nuclear reactor 2 to the outside of the nuclear reactor 2, a shielding 4 blocking radiation from inside the nuclear reactor 2, a power generating section 5 converting heat transmitted through the heat pipes 3 to electricity, and a plurality of radiators 6 dissipating the remaining heat of the power generating section 5.

In a small nuclear reactor device 1 expected to be used in space, the shielding 4 can be between the nuclear reactor 2 and the power generating section 5, and thereby radiation from the nuclear reactor 2 does not reach any component part behind the shielding 4 from the nuclear reactor 2. The arrangement of the shielding 4 is not limited just to between the nuclear reactor 2 and the power generating section 5. In a small nuclear reactor device 1 expected to be used on earth, the shielding 4 can alternatively cover the entire circumference of the nuclear reactor 2.

The nuclear reactor 2 further includes, for example, a container 7 covering the nuclear fuel and the heat pipes 3, and (not shown) a moderator decelerating neutrons and a control rod controlling fission reaction. The container 7 may include a neutron reflector reflecting neutrons emitted from nuclear fuel. A structure including nuclear fuel, the heat pipes 3, the moderator, the control rod, and the container 7 may be referred to as a core 32. The heat pipes 3 as a heat removal mechanism are included in the core 32. The function of the core 32 is the same as the reactor 2. A shape of the nuclear reactor 2 and the core 32 is not limited to a cylinder. In some embodiments, the shape of the nuclear reactor 2 and the core 32 are, for example, a cylinder, a rectangular, or a cone. The core 32 includes a plurality of the heat pipes 3 arranged in parallel to each central axis of the fuel containing fissile material.

The power generating section 5 includes thermoelectric conversion elements to convert heat transmitted through the heat pipes 3 to electricity. The thermoelectric conversion elements generate electricity by temperature differences occurring in them.

The power generating section 5 is not limited to generating electricity with thermoelectric conversion elements. The power generating section 5 could convert heat to electricity with, for example, turbines or a stirling engine. In that case, turbines rotate with steam generated by heat from the heat pipes 3 and generate electricity. The stirling engine is driven by a change of volume of gas sealed in the stirling engine and generates electricity.

Figure 2:
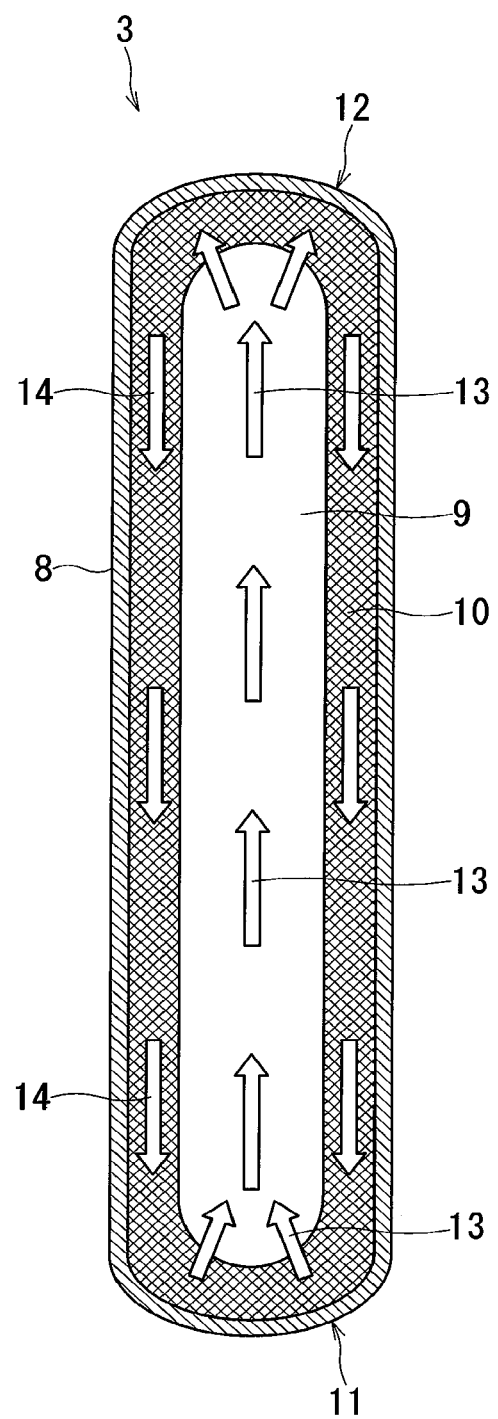
FIG. 2 is a schematic view of a heat pipe of the first embodiment.

As shown in FIG. 2, showing one of the heat pipes 3, working fluid transfers heat in the heat pipe 3. The heat pipe 3 includes a pipe case 8 made of materials with high thermal conductivity, a volatile liquid as the working fluid being sealed in the pipe case 8, a vacant space 9, and wick 10 forming a capillary structure on an inside of the pipe case 8. The vaporized working fluid moves in the vacant space 9. The pipe case 8 and the wick 10 can be made of aluminum and copper, for example. The working fluid is, for example, a fluorocarbon substitute.

The end of the heat pipe 3 is a high temperature section 11 which is expected to be heated from the outside, and the other end of the heat pipe 3 is a low temperature section 12 which is expected to be cooled from the outside. The cycle of the evaporation at the high temperature section 11 (absorption of latent heat) and condensation at the low temperature section 12 (release of latent heat) of the working fluid effects heat transfer in the heat pipe 3.

The following is an example of that cycle in the heat pipe 3. The working fluid is heated at the high temperature section 11. The working fluid absorbs heat and evaporates to gas 13. The gas 13 moves to the low temperature section 12 through the vacant space 9. The gas 13 is cooled at the low temperature section 12. The gas 13 releases heat and condenses to liquid 14. The liquid 14 at the low temperature section 12 moves to the high temperature section 11 through the wick 10 by capillary action. That cycle is executed even if there is no difference in height between the high temperature section 11 and the low temperature section 12 or even if the heat pipe is in a zero gravity or law gravity condition. For example, in space heat transfers from the high temperature section 11 to the low temperature section 12 in the heat pipe 3 due to such a cycle of evaporation and condensation of the working fluid and moving the gas 13 and the liquid 14.

High temperature sections 11 of the plurality heat pipes 3 are inserted in the core 32. Low temperature sections 12 of the heat pipes 3 extend linearly from the core 32 in the reactor 2 to end in the power generating section 5. The power generating section 5 converts heat to electricity, and heat generated in the core 32 is transferred to the power generating section 5 through the heat pipes 3.

The reactor 2 is further described with reference to FIG. 3. The same configurations as those already described are given the same reference symbols, thereby omitting overlapping description.

Figure 3:
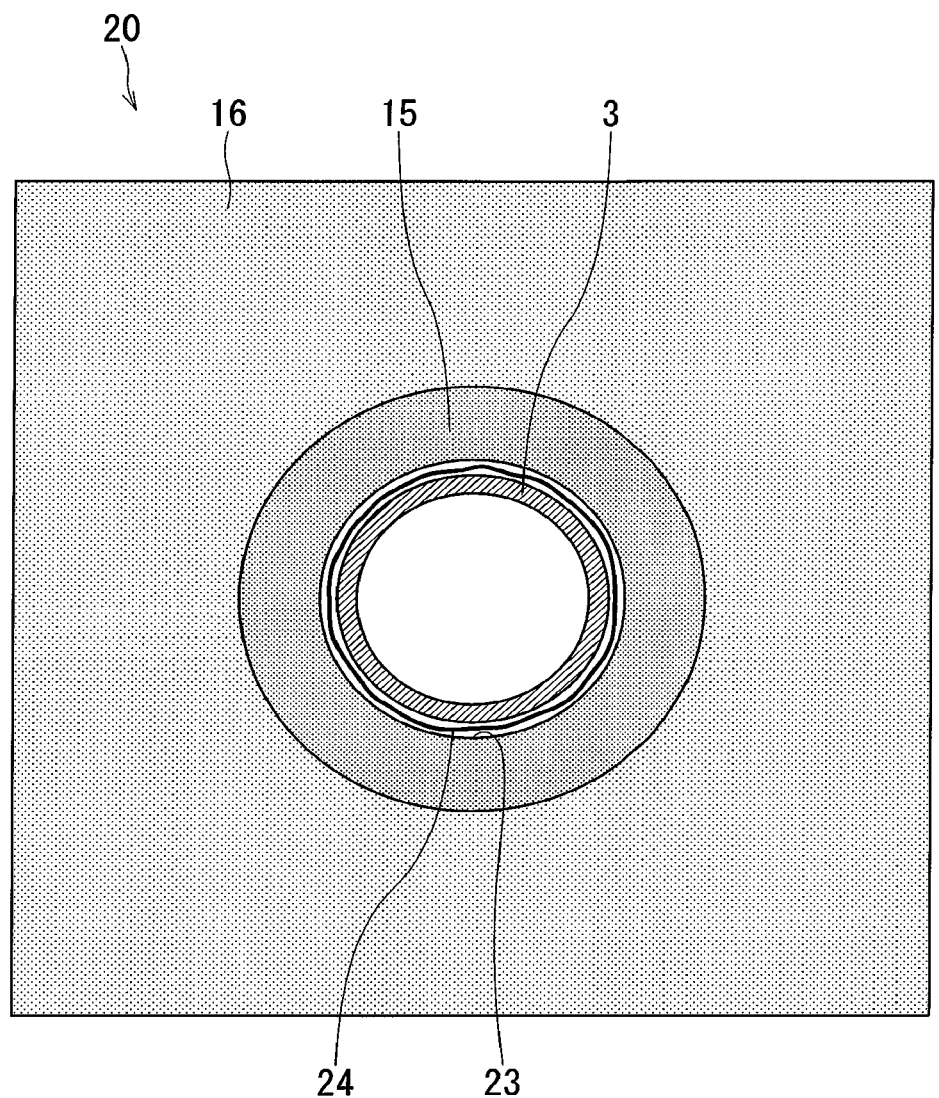
FIG. 3 is a schematic view illustrating a placement of nuclear fuels described in the first embodiment.

FIG. 3 is a cross-sectional enlarged view of a cell 20 of the core 32 perpendicular to the central axis of the heat pipe 3. A direction parallel to the central axis of the heat pipe 3 is referred to as the third direction. In FIG. 3 the internal structures of the heat pipe 3 are omitted from illustration. To aid understanding, some hatching may be omitted in each sectional view. Fuel 15 and fuel 16 are around the heat pipe 3. The fuel 15 and the fuel 16 contain fissile material causing a fission reaction and non-fission material not causing a fission reaction. The fissile material is, for example, Uranium 235 (U 235). The non-fission material is, for example, Uranium 238 (U 238). The fissile material is not limited to U 235. In some embodiments, the fissile material can be U233, Pu239, PU241, Am 242, Cm 243 and Cm 245. In some embodiments, the non-fission material can be U233, Pu239, PU241, Am 242, Cm 243 and Cm 245. The fuel 15 and 16 may contain various kinds of materials as a base material, for example, metal, oxide, nitride, carbide, chloride, and fluoride.

Fuel with a high fissile material concentration generates heat highly per unit volume by a fission reaction. The fuel 15 contains fissile material at a first concentration. The fuel 16 contains fissile material at a second concentration. The first concentration is higher than the second concentration. Below, the fuel 15 is referred to as the first fuel 15, and the fuel 16 is referred to as the second fuel 16.

According FIG. 3, the first fuel 15 is allocated around a side surface of the heat pipe 3 parallel to the central axis of the heat pipe 3. The second fuel 16 is allocated further from the heat pipe 3 than the first fuel 15. For example, the second fuel 16 is allocated on an outer side of the first fuel 15. In FIG. 3, the second fuel 16 is around the first fuel 15. In the core 32, a first area and a second area include the first fuel 15 and the second fuel 16 respectively in FIG. 3. Concentration of the fissile material in the first area is more than that in the second area. Heat generated in the first area is more easily transferred by the heat pipes 3 than heat generated in the second area. In the core 32 the heat pipes 3 are arranged at equal intervals.

The shape of the first fuel 15 can be a cylinder with a heat pipe 3 as its central axis. The shape of the second fuel 16 can be a rectangular with the first fuel 15 inserted therein. A pair of the first fuel 15 and the second fuel 16 form the cell 20. A plurality of the cells 20 arranged parallel to the heat pipe 3 form the core 32. In a cross-sectional view of the core 32 perpendicular to the central axis of the core 32, the boundaries of the cells 20 form a grid.

The shape of the first fuel 15 and the second fuel 16 is not limited to a cylinder or a rectangular. In embodiments, the first fuel 15 and the second fuel 16 could be shaped as a circle, oblong, triangle, rectangle, or hexagon in a cross-sectional view of the core 32 perpendicular to the central axis of the core 32.

The shape of the heat pipe 3 is not limited to a circular tube. The cross-sectional shape of the heat pipe 3 perpendicular to its central axis is not limited to a circle. In embodiments, the cross-sectional shape of the heat pipe 3 perpendicular to its central axis could be, for example, an oval, triangle, quadrangle, or hexagon. Each of the plurality of the heat pipes 3 is not limited to the same shape. In embodiments, the diameter of each heat pipe 3 could be different. In one heat pipe 3, there may be parts with different diameters.

During criticality, the first fuel 15 generates heat with higher power density than the second fuel 16. This is because the concentration of fissile material of the first fuel 15 is higher than that of the second fuel 16. Formula (1) is the relationship between the thickness of a plate-like heat conductor and heat conducted by a heat conductor. $\lambda$ is thermal conductivity of the heat conductor. A is area conducting heat. $\Delta T$ is temperature difference in the conductor. l is thickness of the heat conductor. q is heat conducted by the heat conductor. According to the formula (1), $\Delta T$ and l are inversely proportional. By decreasing l, more heat can be transferred even if $\Delta T$ is limited.

$$q = \frac{\lambda A \Delta T}{l} \quad (1)$$

In FIG. 3, thickness of fuel around the heat pipe 3 in the direction perpendicular to the central axis is l in equation (1). Heat generated in the fuel will be more greatly transferred to the heat pipe 3, in the thickness direction, with a temperature farther from the heat pipe 3 being higher than the temperature nearer the heat pipe 3. Such temperature difference in the thickness direction is $\Delta T$.

According to FIG. 3, the first fuel 15 is arranged nearer around the heat pipe 3. This means that the l of the first fuel 15 is limited to a smaller amount in the core 32. _For example, consider the two cases that the thickness of the first fuel 15 is l or l', in which l' is longer than l. When the first fuel 15 within l and l' transfer the same amount of the heat to the heat pipes 3, $\Delta T$ of the first fuel 15 within l is smaller than $\Delta T$ of the first fuel 15 within l'. Thereby temperature difference within the core 32 is suppressed.

As described above, the second fuel 16 generates less heat than the first fuel 15. Thereby, using the second fuel 16 with a lower concentration of fissile material arranged around the first fuel 15 prevents a rising temperature locally even if heat generated in the second fuel 16 is not as easily transferred to the heat pipes 3. Also, the second fuel 16 around the first fuel 15 maintains the $\Delta T$ in the first fuel 15.

In other words, the first fuel 15 around the heat pipes 3 and the second fuel 16 around the first fuel 15 prevent the temperature farther from the heat pipes 3 in the core 32 from becoming much higher than in other parts in the core 32. Also that results in the core outputting more energy with a smaller temperature difference in the core 32.

The thickness of the first fuel 15 is preferably within an appropriate range obtained by preliminary experiments. For example, when l is shorter than the appropriate range length, the distance from the middle of the second fuel 16 to the heat pipes 3 increases. Then heat at the middle of the second fuel 16 is less likely to be transferred to the heat pipe 3 and the temperature in the middle of the second fuel 16 increases. As a result, the temperature difference within the core 32 may increase.

The first fuel 15 is arranged as a cylinder around the heat pipe 3 in the shown embodiment. Between the first fuel 15 and the heat pipe 3, there is a clearance or gap 23. The clearance or gap 23 may be in a cylinder shape around the heat pipe 3. That is, the inner diameter of the cylindrical first fuel 15 can be greater than the outer diameter of the heat pipe 3.

During operation of the nuclear reactor 2, the volume of the first fuel 15 and the second fuel 16 expand compared with their volume before the nuclear reactor 2 operation. The clearance 23 prevents the core 32 from bursting due to expanding of the first fuel 15 and the second fuel 16.

Before the nuclear reactor 2 starts operating, the heat pipe 3 is covered with a metal foil 24. The metal foil 24 is made of metal that melts at the nuclear reactor's 2 operating temperature. For example the metal foil 24 is made of Gallium, sodium, lithium, lead, bismuth, and alloy. The metal foil 24 may include a single metal layer or multiple metal layers.

When the metal layer 24 melts at a temperature during operation of the nuclear reactor 2, the melted metal layer 24 fills the clearance or gap 23. The melted metal layer 24 improves heat conduction efficiency from the first fuel 15 to the heat pipe 3. During operation of the nuclear reactor 2, the metal layer 24 is liquid and flexible in the clearance or gap 23. The clearance or gap 23 and the metal layer 24 prevent the core 32 from bursting due to expanding of the fuels 15, 16.

The metal layer 24 is not limited to being between the first duel 15 and the heat pipe 3. In some embodiments, the metal layer 24 can be arranged between the first fuel 15 and the second fuel 16. The metal layer 24 may be arranged in other parts in the core 32.

The metal layer 24 is solid during constructing and before the nuclear reactor 2 starts operation. Thereby, the metal layer 24 can easily cover the heat pipe 3. The loading of the metal layer 24 can be adjusted by changing the number of wrappings of the metal foil around the heat pipe 3. After the nuclear reactor 2 starting operating, the metal layer 24 becomes a liquid in the clearance or gap 23.

The metal layer 24 is not limited to a metal foil before the nuclear reactor 2 starts operating. Before the nuclear reactor's 2 operating, the metal layer 24 may be metal particles or metal powder filled in the clearance or gap 23.

An arranged nuclear reactor 2 is described with reference to FIG. 4. It is noted that the same configurations as those described above are given the same reference symbols, thereby omitting overlapping description.

Figure 4:
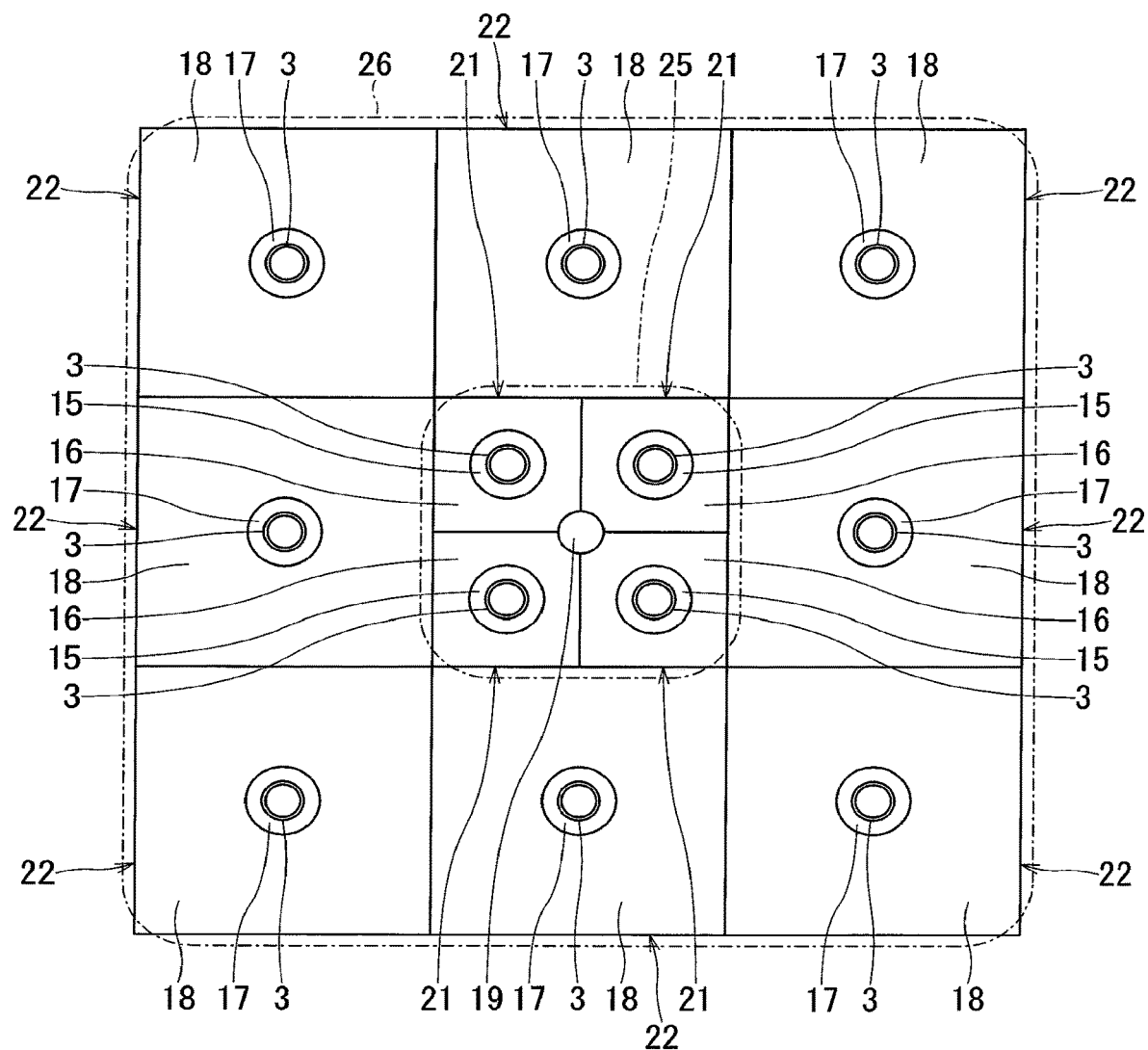
FIG. 4 is a schematic view illustrating a placement of nuclear fuels in a core in an embodiment.

FIG. 4 is an enlarged cross section of the core 32 perpendicular to the heat pipes 3. In the enlarged cross section of the core 32, there is a first area 25 and a second area 26. There are more heat pipes 3 per unit area in the first area 25 than those in the second area 26. The second area 26 is arranged around the first area in cross section of the core 32 perpendicular to the heat pipes 3.

Heat transmitted to the heat pipes 3 per unit area in the first area 25 is greater than that per unit area in the second area 26, due to the difference of the number of the heat pipes 3 between the first area 25 and the second area 26. In the second area 26, there may be no heat pipes 3.

All the heat pipes 3 have the same shape and the same diameter. A distance between two adjacent heat pipes 3 in the first area 25 is smaller than that in the second area 26. Thereby, heat to be transferred by the heat pipes 3 per unit area in the second area 26 is less than that per unit area in the first area 25. Heat generated in the second area 26 is thus less transferred by the heat pipes 3 than in the first area 25.

As in FIG. 3, the first area 25 includes the first fuel 15 containing fissile material at a first concentration and the second fuel 16 containing fissile material at a second concentration. The second concentration is less than the first concentration. The distance between the first fuel 15 and a heat pipe 3 is smaller than that between the second fuel 16 and the heat pipe 3. For example, the first fuel 15 is allocated around a side surface of the heat pipe 3 parallel to a central axis of the heat pipe 3, and the second fuel 16 is allocated on an outer side of the first fuel 15. In FIG. 4, the second fuel 16 is around the first fuel 15.

The second area 26 includes the third fuel 17 containing fissile material at a third concentration and a fourth fuel 18 containing fissile material at a fourth concentration. The distance between the third fuel 17 and a heat pipe 3 is smaller than that between the fourth fuel 18 and the heat pipe 3. For example, the third fuel 17 is allocated around a side surface of the heat pipe 3 parallel to a central axis of the heat pipe, and the fourth fuel 18 is allocated on an outer side of the third fuel 17. In FIG. 4, the fourth fuel 18 is around the third fuel 17.

Concentration of fissile material in the first area 25 is different from that in the second area 26.

The second concentration is less than the first concentration. The third concentration is less than the second concentration. The fourth concentration is less than the third concentration. Thereby, concentration of fissile material per unit area in the second area 26 is less than that in the first area 27. Thereby, a temperature rise in the second area 26 is suppressed, even though the heat transferred to the heat pipes 3 per unit area in the second area 26 is less than that per unit area in the first area 25.

Fissile material concentration of either the first fuel 15 or the second fuel 16 may be the same fissile material concentration of either the third fuel 17 or the second fuel 16. For example, fissile material concentration of the second fuel 16 may be the same as that of the third fuel 17. Fissile material concentration of the first fuel 15 may be the same as that of the third fuel 17 when the fissile material concentration of the fourth fuel 18 is less than that of the second fuel 16. Fissile material concentration of the second fuel 16 may be the same as that of the fourth fuel 18 when the fissile material concentration of the third fuel 17 is less than that of the first fuel 18.

The first fuel 15 is in a cylindrical shape surrounding the heat pipe 3. The first fuel 15 is inserted by the heat pipe 3. The central axis of the first fuel 15 is parallel to that of the heat pipe 3. The second fuel 16 is a quadrangular prism surrounding the first fuel 15. The second fuel 16 is inserted around the first fuel 15. The central axis of the second fuel 16 is parallel to that of the first fuel 15. The third fuel 17 is in a cylindrical shape surrounding the heat pipe 3. The third fuel 17 is inserted by the heat pipe 3. The central axis of the third fuel 17 is parallel to that of the heat pipe 3. The fourth fuel 18 is a quadrangular prism surrounding the third fuel 17. The fourth fuel 18 is inserted around the third fuel 17. The central axis of the fourth fuel 18 is parallel to that of the third fuel 17.

The first cells 21 include a pair of the first fuel 15 and the second fuel 16. The second cells 22 include a pair of the third fuel 17 and the fourth fuel 18. In a cross section of the core 32 perpendicular to its central axis, a sectional area of the second cells 22 is larger than that of the first cells 21. For example, in FIG. 4, vertical and horizontal dimensions of the second cells 22 are twice as that of the first cells 21 respectively.

The four first cells 21 are allocated around a control rod 19 with each cell facing the control rod 19. The control rod 19 is at the same position as the central axis of the core 32. To control the fission reaction, extracting and inserting of the control rod 19 is controlled. The first area 25 made of the four first cells 21 is a higher importance area. The control rod 19 arranged in the first area 15 as the higher importance area improves absorption efficiency of neutrons by the control rod 19. This means that fewer control rods can control the output from the nuclear reactor 2.

Extracting and inserting of the control rod 19 may be controlled by control rod drive mechanisms. The control rod 19 is not limited to a bar. For example, the control rod 19 may be a material that expands with a rise in temperature. The control rod 19 beats into the core 32 by expansion and absorbs neutrons.

An embodiment of an arranged nuclear reactor 2 is described with reference to FIG. 5 below. It is noted that the same configurations as those described above are given the same reference symbols, thereby omitting overlapping description.

Figure 5:
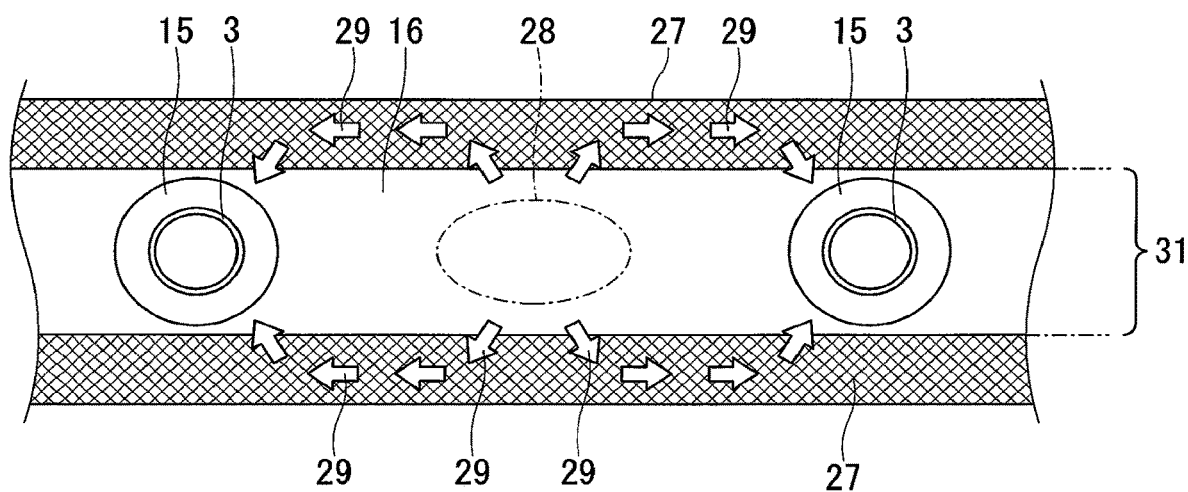
FIG. 5 is a schematic view illustrating first heat conductors in an embodiment.

FIG. 5 is an enlarged sectional view of the nuclear reactor 2. This sectional view is perpendicular to the direction parallel to the central axis of the heat pipe 3. The first fuel 15 contains fissile material at a first concentration. The second fuel 16 contains fissile material at a second concentration. The first fuel 15 is allocated around a side surface of the heat pipe 3 parallel to a central axis of the heat pipe 3. The second fuel 16 is allocated farther from the heat pipe 3 than the first fuel 15.

A layer 31 includes a plurality of heat pipes 3 parallel to their central axes. The direction in which the heat pipes 3 are aligned in parallel is defined as the first direction. The layer 31 includes the first fuel 15 around the heat pipe 3. The layer 31 also includes the second fuel 16 around the first fuel 15 around each of the heat pipes 3 next to each other in the layer 31. A thickness of the second fuel 16, perpendicular to the first direction and the third direction, is the same as the outer diameter of the first fuel 15 or a little larger than the outer diameter of the first fuel 15.

The first heat conductor 27 is along a side surface of the layer 31 and parallel to the third direction. The thermal conductivity of the first heat conductor 27 is larger than that of the second fuel 16. The first layer 31 is between the two first heat conductors 27. For example, the first layer 31 is made of beryllium.

In the second fuel 16, most of heat generated near the first fuel 15 is likely to be transferred to the heat pipe 3. In the second fuel 16, most of heat generated farther from the first fuel 15 is harder to be transferred to the heat pipe 3. This means that heat in the middle of the second fuel 16 is hard to have transferred. The middle part of the second fuel 16 is thereby referred to as a low conductive area 28.

The first heat conductors 27 are provided to transfer heat in the low conductive area 28 to nearer the first fuel 15. In other word, heat generated in the second fuel 16 is transferred to the first fuel 15 by the first heat conductors 27. And heat in the first fuel 15 is transferred to the heat pipe 3. Thereby a temperature rise in the second fuel 16 is suppressed. The first heat conductor 27 operates as a bypass by transferring heat from the second fuel 16 to the first fuel 15.

The first heat conductor 27 made of beryllium has high thermal conductivity and increases neutrons radiated from the fuel 15, 16 to promote the fission reaction. Beryllium included in the first heat conductor 27 increase neutrons by (n, 2n) reaction and improves criticality of the fuel 15, 16. Material included in the first heat conductor 27 is not limited to beryllium. For example, the material may be copper, liquid, or another solid.

An embodiment of an arranged nuclear reactor 2 is described with reference to FIG. 6 below. It is noted that the same configurations as those described above are given the same reference symbols, thereby omitting overlapping description.

Figure 6:
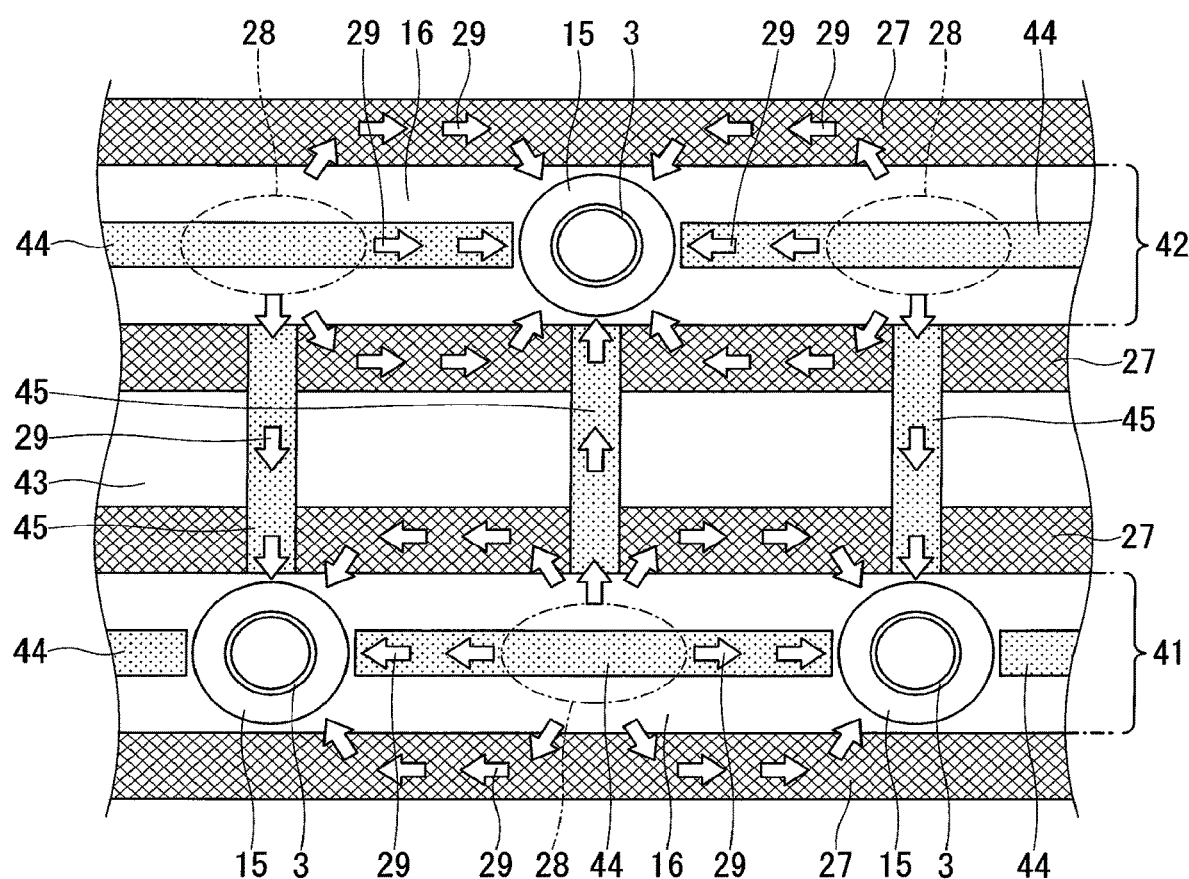
FIG. 6 is a schematic view illustrating second heat conductors and third heat conductors in an embodiment.

FIG. 6 is an enlarged sectional view of the nuclear reactor 2. This sectional view is perpendicular to the third direction. The first fuel 15 contains fissile material at a first concentration. The second fuel 16 contains fissile material at a second concentration. The first fuel 15 is allocated around a side surface of the heat pipes 3 parallel to a central axis of the heat pipes 3. The second fuel 16 is allocated farther from the heat pipes 3 than the first fuel 15.

The first layer 41 and the second layer 42 include a plurality of heat pipes 3 parallel to their central axes, respectively. Each layer 41, 42 includes the first fuel 15 around a heat pipe 3. Each layer 41, 42 also includes the second fuel 16 around the first fuel 15 around each of the heat pipes 3 next to each other in the layer 41, 42. The thickness of the second fuel 16, perpendicular to the first direction and the third direction, is the same as the outer diameter of the first fuel 15 or a little larger than the outer diameter of the first fuel 15. The second layer 42 is stacked on the first layer 41 in the direction perpendicular to the first direction and the third direction.

The heat pipe 3 of the second layer 42 is allocated between two heat pipes 3 next to each other in the first layer 41. With this order, as seen from the second direction, the heat pipes 3 in the layers next to each other are prevented from overlapping. Thereby, a local temperature rise in the core 32 is suppressed.

The layers 41, 42 are sandwiched between the two first heat conductors 27, respectively. The first heat conductor 27 is in a plate shape. Thermal conductivity of the first heat conductor 27 is higher than that of the second fuel 16. A moderator 43 is provided between the first layer 41 and the second layer 42, the layers 41 and 42 are sandwiched between the first heat conductors 27. The moderator 43 is made of, for example, a solid metal hydride. For example, the moderator 43 includes calcium hydride, zirconium hydride, lanthanum hydride, praseodymium hydride, or graphite.

In FIG. 6, the first heat conductor 27 made of beryllium is arranged closer to the fuels 15, 16 than moderator 43. Thereby, neutrons reach the first heat conductor 27 without going through the moderator 43. The first heat conductor 27 increases neutrons by (n, 2n) reaction without an influence of deceleration caused by the moderator 43.

A second heat conductor 44 is in the second fuel 16 in the layers 41, 42 and parallel to the first direction. The second heat conductor 44 is arranged between two heat pipes 3 in a layer. A third heat conductor 45 connects two overlapping layers which are in the first layer 41 and the second layer 42. One end of the third heat conductor 45 is closer to the heat pipe 3 than the other end. In other words, the third heat conductor 45 connects the second fuel 16 closer to the heat pipe 3 in the first layer 41 and the low conductive area 28 in the second layer 42. The other third heat conductor 45 connects the second fuel 16 closer to the heat pipe 3 in the second layer 42 and the low conductive area 28 in the first layer 41. The third heat conductor 45 is parallel to the second direction.

The heat conductors 44, 45 are a plate or a bar. Heat conductivity of the heat conductors 44, 45 is higher than that of the second fuel 16. Heat conductivity of the heat conductors 44, 45 may be the same as or higher than that of the first heat conductor 27. The heat conductors 44, 45 are made of materials with high thermal conductivity such as beryllium or copper. The heat conductors 44, 45 may be liquid or solid.

The heat conductors 44, 45 transfer heat generated in the low conductive area 28 to nearer the first fuel 15. The heat conductors 44, 45 transfer heat generated farther from the heat pipe 3 to nearer the first fuel 15. Thereby, a temperature rise caused by heat generated in the low conductive area 28 is suppressed.

Heat 29 generated in the second fuel 16 is transferred to the first fuel 15 through the first heat conductor 27. Heat 29 is transferred to the heat pipe 3 through the first fuel 15. Thereby, a temperature rise in the second fuel 16 is suppressed.

An embodiment of an arranged nuclear reactor 2 is described with reference to FIG. 7 to FIG. 16 below. It is noted that the same configurations as those described above are given the same reference symbols, thereby omitting overlapping description.

Figure 7:
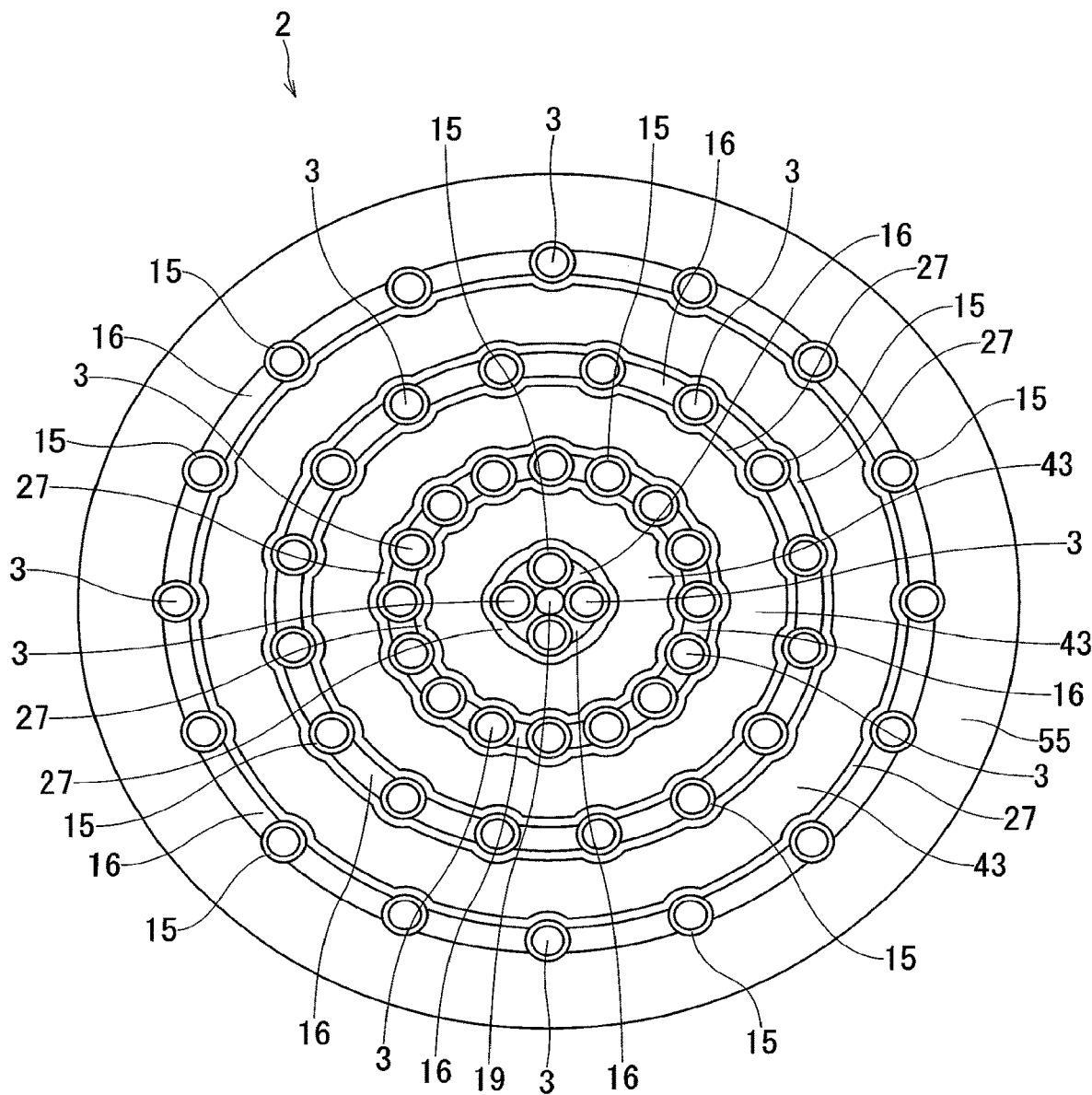
FIG. 7 is a schematic cross-sectional view of a nuclear reactor in an embodiment.

The nuclear reactor 2 and the core 32 are each a cylinder. The core 32 includes a plurality of the heat pipes 3 parallel to the central axis of the core 32. Each of the heat pipe 3 has the same structure. FIG. 7 is a cross-sectional view of a nuclear reactor, perpendicular to the third direction.

Figure 8:
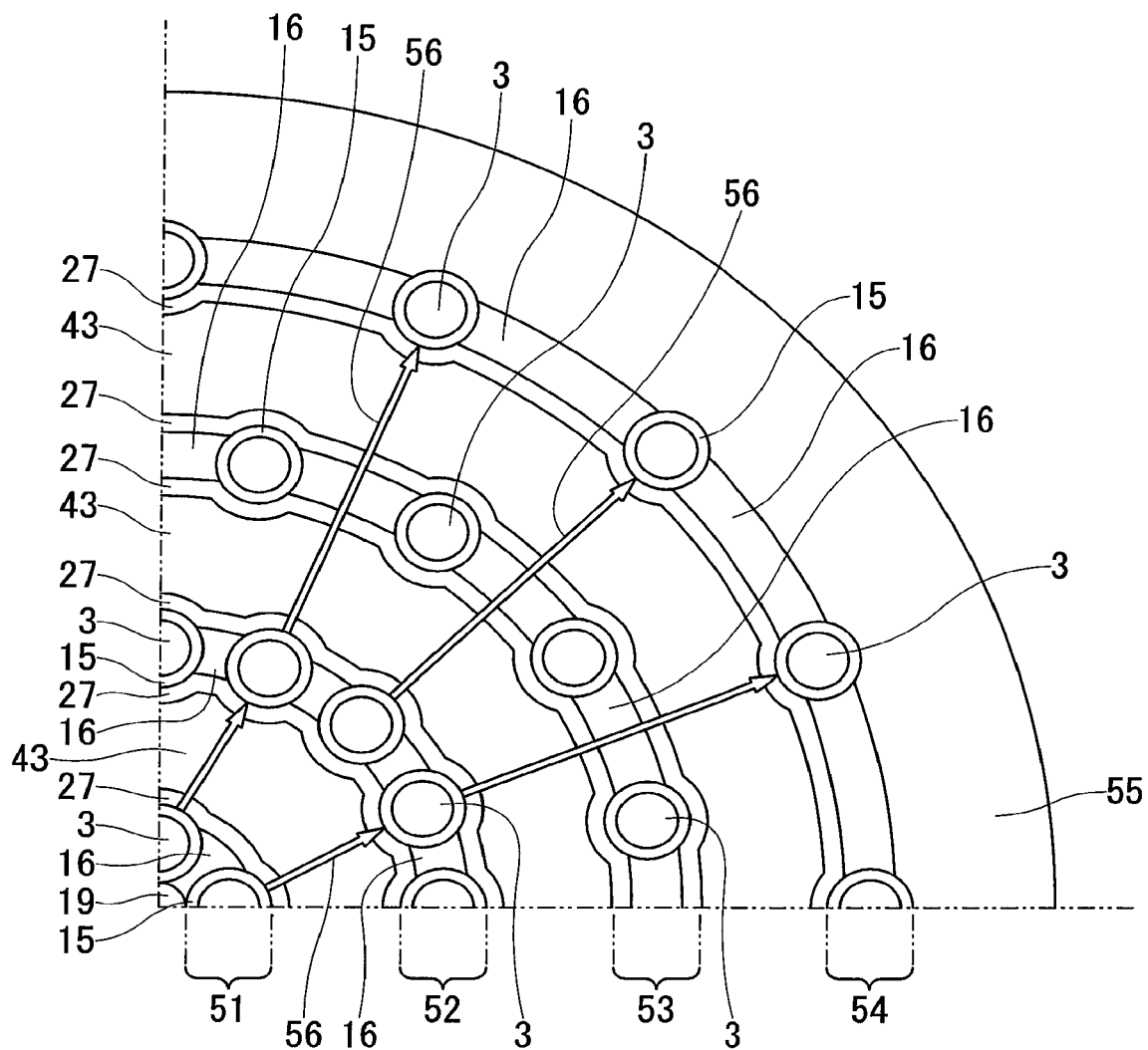
FIG. 8 is a schematic cross-sectional enlarged view of a nuclear reactor in an embodiment.

As shown in FIG. 8 layers 51, 52, 53, 54 are concentrically arranged cylinders that include the heat pipes 3 and the first fuels 15.

The third layer 53 is inside of the fourth layer 54. The second layer 52 is inside of the third layer 53. The first layer 51 is inside of the second layer 52. The layers 51, 52, 53, 54 are each in a cylindrical shape. This arrangement of the layers 51-54 improves efficiency to transfer heat. This arrangement of the layers 51-54 also contributes to miniaturization of the nuclear reactor 2.

FIG. 8 is a cross-sectional view of a quarter of nuclear reactor 2, perpendicular to the third direction. The control rod 19 is arranged in the central axis of the core 32. The layers 51, 52, 53, 54 are arranged as multiple cylindrical shaped layers concentrically around the control rod 19. The control rod 19 is arranged adjacent the first layer 51.

In each of the layers 51, 52, 53, 54, the same number of heat pipes 3 are arranged at equal intervals. Thereby, the number of the heat pipes 3 per unit area decreases with distance from the center of the core 32, so that the number of the heat pipes 3 per unit area of the first layer 51 is the highest in the core 32. The number of the heat pipes 3 per unit area of the fourth layer 54 is the lowest in the core 32.

The first layer 51 is defined as a first area. The second layer 52 is defined as a second area. The third layer 53 is defined as a third area. The fourth layer 54 is defined as a fourth area. Heat transferred to the heat pipes 3 per unit area in the first area is more than that of the second area. Heat transferred to the heat pipes 3 per unit area in the second area is more than that of the third area. Heat transferred to the heat pipes 3 per unit area in the third area is more than that of the fourth area.

The third area tends to have the highest temperature. In the third area, the heat transferred to the heat pipes 3 per unit area is smaller than other areas Except sometimes, the heat transferred to the heat pipes 3 per unit area in the fourth area is less than that of the third area. However, the temperature in the fourth area is lower than the third area because there is no more fuel outside the fourth layer 54.

The moderators 43 are between the first layer 51 and the second layer 52, between the second layer 52 and the third layer 53, and between the third layer 53 and the fourth layer 54. A neutron reflector 55 is on the fourth layer 54. The neutron reflector 55 contains beryllium. The neutron reflector 55 reflects neutrons from the fuel towards the center of the core 32.

Figure 9:
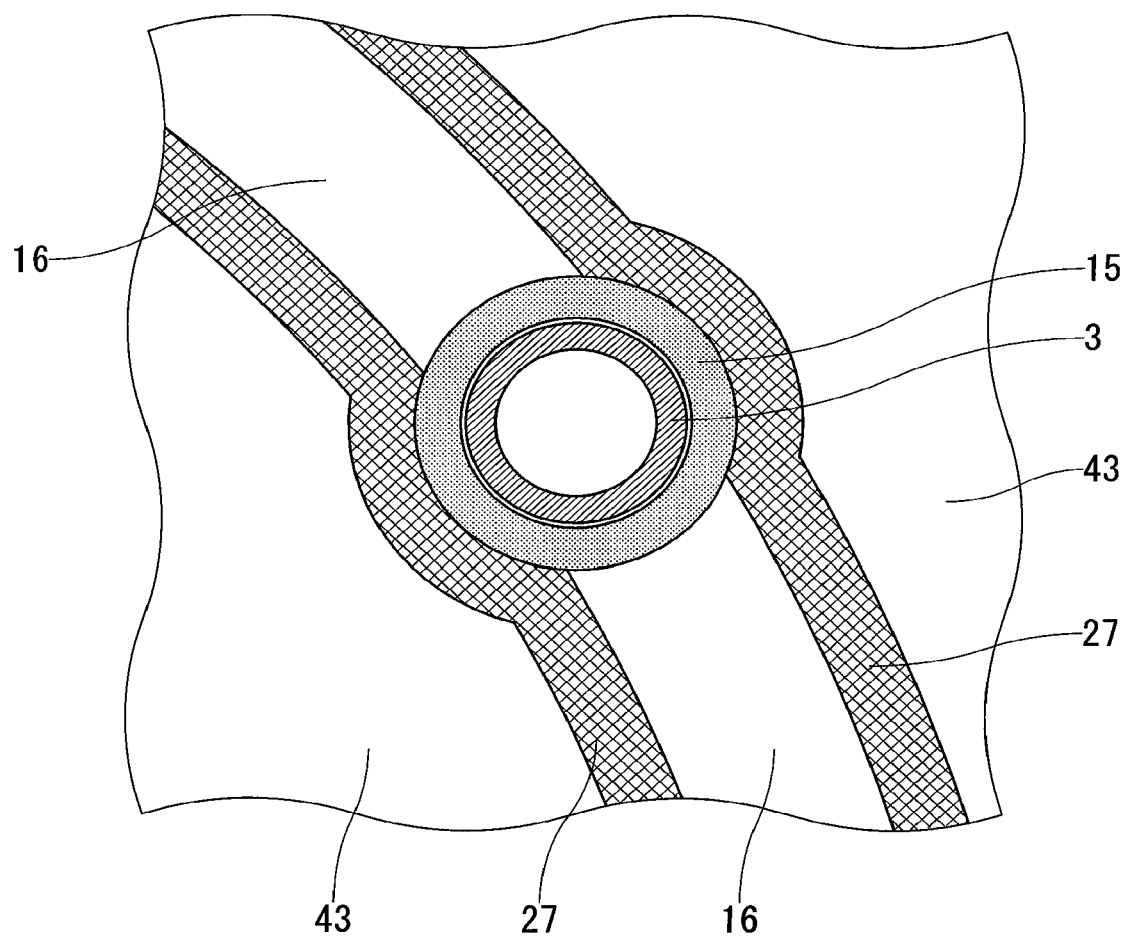
FIG. 9 is a schematic cross-sectional view of a nuclear reactor in an embodiment, illustrating a placement of nuclear fuels in a nuclear reactor.

As shown in FIG. 9 showing a portion around a heat pipe 3 in FIGS. 7-8, the first fuel 15 is allocated around a side surface of the heat pipe 3 parallel to a central axis of the heat pipe 3. The second fuel 16 is allocated outside of the first fuel 15, farther from the heat pipe 3 than the first fuel 15. The first fuel 15 contains fissile material at a first concentration. The second fuel 16 contains fissile material at second concentration. The first concentration is higher than the second concentration.

A first direction is a circumferential direction of each layer 51, 52, 53, 54. The second fuel 16 is arranged along the first direction between respective first fuels 15 next to each other in the layers 51, 52, 53, 54. A respective first heat conductor 27 contacts respective side surfaces of the layers 51, 52, 53, 54 parallel to a central axis of a respective heat pipe 3. Each first heat conductor 27 contacts with a first fuel 15 and a second fuel 16. The contact area of the first fuel 15 and the first heat conductor 27 is curved. The contact area is thereby larger than when the contact area is a plane. The larger contact area improves the heat conduction between the first heat conductor 27 and the first fuel 15.

The moderator 43 is allocated along the first heat conductor 27.

The thickness of the first heat conductor 27 is thinner than that of the moderator 43. The neutrons from the fuels 15, 16 can go through the first heat conductor 27. The first heat conductor 27 nearer the fuels 15, 16 tends to increase the number of neutrons due to reflection. The neutrons generated in a layer are decelerated by the moderator 43 and fission reaction is likely to occur until a neutron reaches another layer.

Neutrons hit the first fuel 15 efficiently in the core 32, in which the layers 51, 52, 53, 54 are arranged as multiple cylindrical shaped layers concentrically. As shown in FIG. 8, neutrons 56 from the first layer 51 can hit the first fuel 15 in the second layer 52. And the neutrons 56 from the second layer 52 can hit the first fuel 15 in the third layer 53, or may hit the first fuel 15 in the fourth layer 54.

The fissile material concentration of the fuel in a layer is not limited to be the same. The fissile material concentration may be different in the third direction. For example, the first and second fuels 15, 16 in every layers 51, 52, 53, 54 can have a divided plurality of sections 57 in the third direction. In each of the sections 57, concentration in the fuels 15, 16 can be adjusted appropriately.

Figure 10:
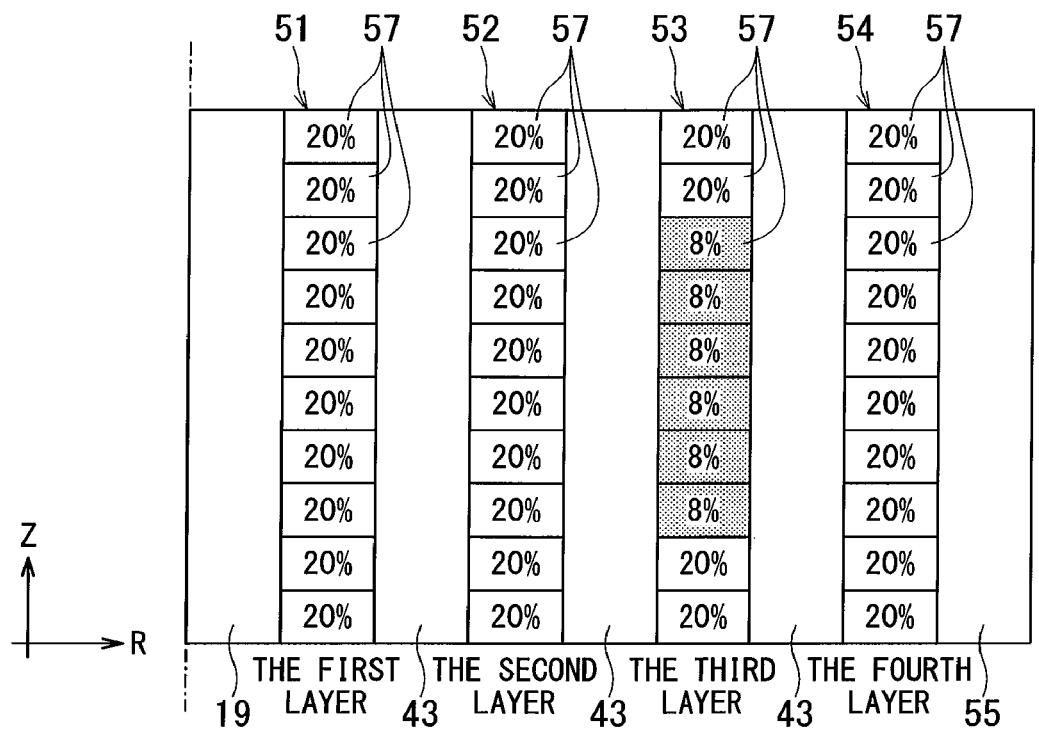
FIG. 10 is a schematic view illustrating concentration of fissile material in a first fuel of each section in an embodiment.
Figure 11:
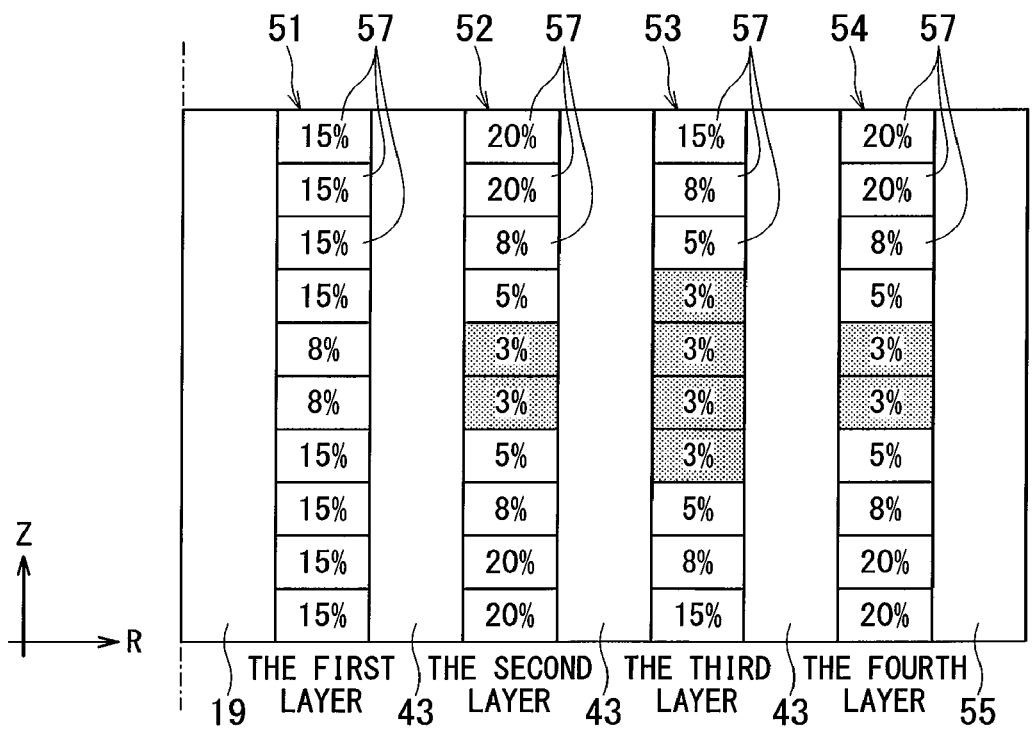
FIG. 11 is a schematic view illustrating concentration of fissile material in a second fuel of each section in an embodiment.

FIGS. 10-11 show how the concentrations of fissile material in the first and second fuels 15, 16 can vary different sections 57 in the height or third direction in each of the different layers 51, 52, 53, 54.

The fissile material concentration in the first fuel 15 of each of the sections 57 is described in FIG. 10. The Z axis in FIG. 10 is the third or height direction. The R axis in FIG. 10 is the second direction. The first fuel 15 is allocated in each section 57.

According FIG. 10, each fissile material concentration of the first fuel 15 in the sections 57 is 20% or 8%. In the layers 51, 52 and 54, the fissile material concentration of the first fuel 15 in each section 57 is 20%. In the third layer 53, the fissile material concentration of the first fuel 15 is 20% or 8%. In the third layer 53, the heat transferred to the heat pipe 3 per unit area is different in the third direction. The heat transferred to the heat pipe 3 per unit area in the middle of the core 32 may be lower than in the other parts. The heat transferred to the heat pipe 3 per unit area in the third layer 53 may be lower than in the other parts.

The fissile material concentration in the first fuel 15 of the center of the core 32 in the third direction, the shaded parts in FIG. 10, can be lower than the other parts. Due to this allocation of the material, the difference of the temperature in the core 32 can be further suppressed.

The concentration of the first fuel 15 in the first layer 51, the second layer 52, the third layer 53 and fourth layer 54 is L11, L12, L13 and L14, respectively. The average concentration of the first fuel 15 can then be L11=L12=L14>L13, or L11≥L12≥L14>L13, or L11>L12>L14>L13, or L11>L12>L13>L14.

The fissile material concentration in the second fuel 16 of each of the sections 57 is described in FIG. 11. The Z axis in FIG. 10 is the third or height direction. The R axis in FIG. 10 is the second direction. The second fuel 16 is allocated in each section 57.

As shown in FIG. 11, each fissile material concentration in the second fuel 16 in the sections 57 is 20%, 15%, 8%, 5% or 3%. The heat transferred to the heat pipe 3 in the core 32 differs in the second direction and the third direction. For example, the heat transferred to the heat pipe 3 in the middle of the third direction in the core 32 is lower than in the other parts. Especially the heat transferred to the heat pipe 3 in the third layer 53 is lower than in the other parts.

The fissile material concentration in the second fuel 16 of the center of the core 32 in the third direction, the shaded parts in FIG. 11, can be lower than the other parts. Due to this allocation of the material, the difference of the temperature in the core 32 can be further suppressed.

The fissile material concentration of the second fuel 16 in the first layer 51, the second layer 52, the third layer 53 and fourth layer 54 is L21, L22, L23 and L24, respectively. The average concentration of the first fuel 15 can then be L21>L22=L24>L13, or L21>L22≥L24>L23, or L21>L22>L24>L23, or L21>L22>L23>L24.

The average fissile material concentration of the first fuel 15 and the second fuel 16 in the layers 51, 52, 53 and 54 are described as the first average concentration, the second average concentration, the third average concentration, and the fourth average concentration, respectively. The average concentration in each layer is not limited to be the same with all the other layers. For example, the second average concentration can be lower than the first average concentration, the fourth average concentration can be lower than the second average concentration, and the third average concentration can be lower than the fourth average concentration.

The fissile material concentration in the fuels 15 and 16 is arranged in the third direction and the second direction. Due to this allocation of the fuel, the difference of the temperature in the core 32 can be further suppressed.

Figure 12:
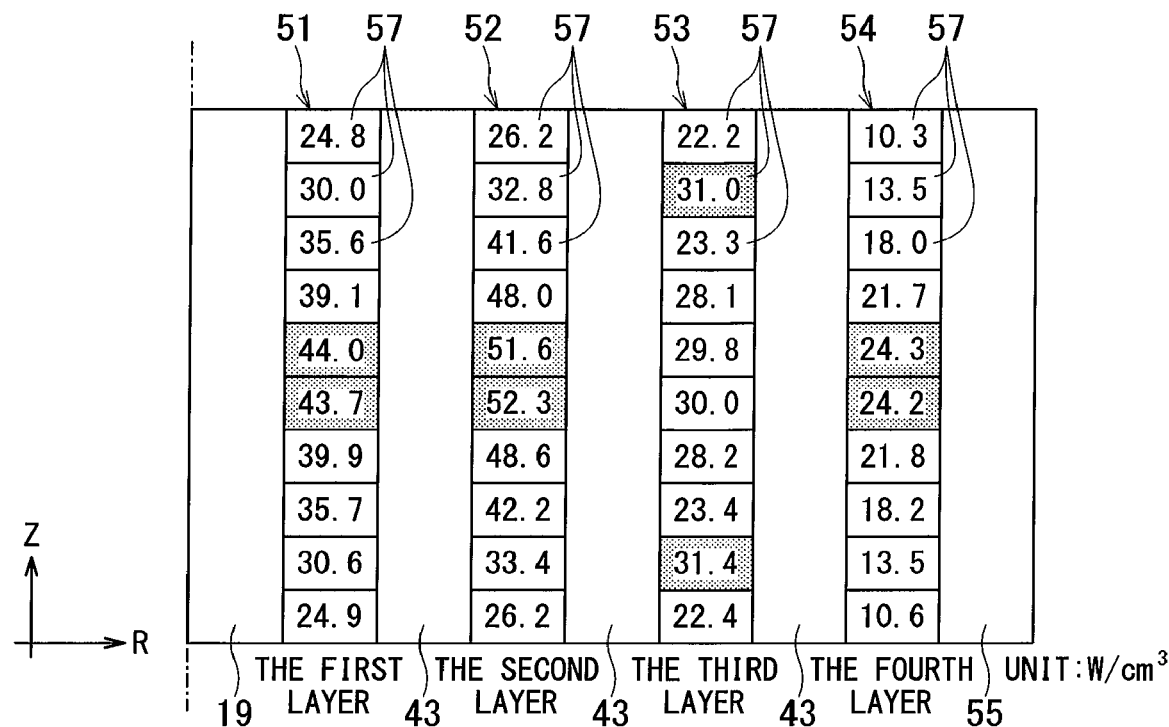
FIG. 12 is a schematic view illustrating amount of energy generated by the first fuel in each section in an embodiment.
Figure 13:
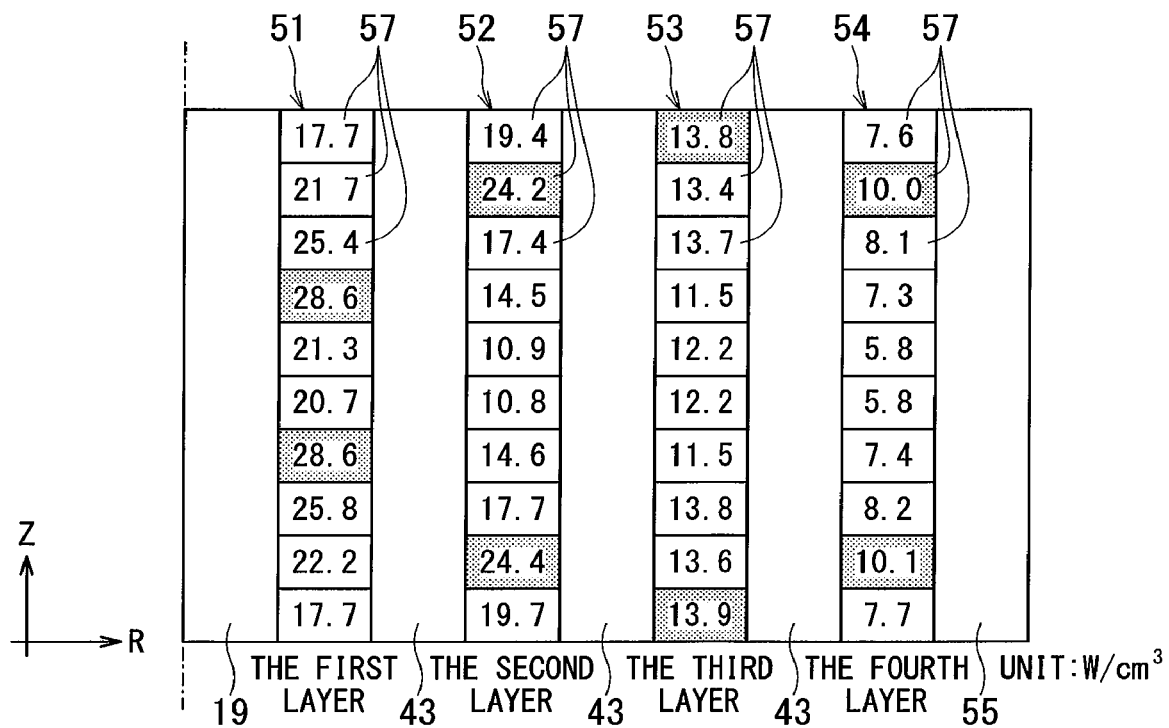
FIG. 13 is a schematic view illustrating amount of energy generated by the second fuel in each section in an embodiment.

The heat generated per unit time in each section 57 is described with reference to FIGS. 12 and 13. The unit of each numerical value is W/cm$^3$. FIG. 12 indicates the heat generated in the first fuel 15 in each section 57. FIG. 12 corresponds to FIG. 10. FIG. 13 indicates the heat generated in the second fuel 16 in each section 57. FIG. 13 corresponds to FIG. 11.

Figure 14:
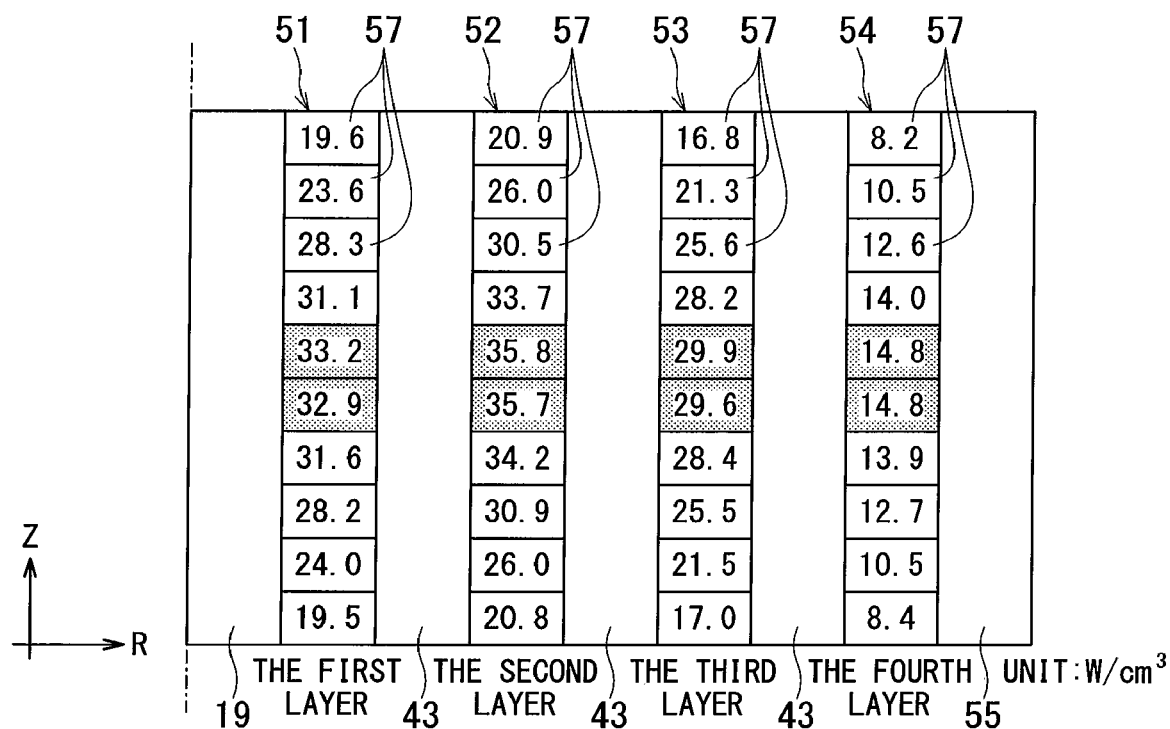
FIG. 14 is a schematic view illustrating amount of energy generated by the first fuel in each section when assuming that the content of the first fuel in each section is equal in an embodiment.
Figure 15:
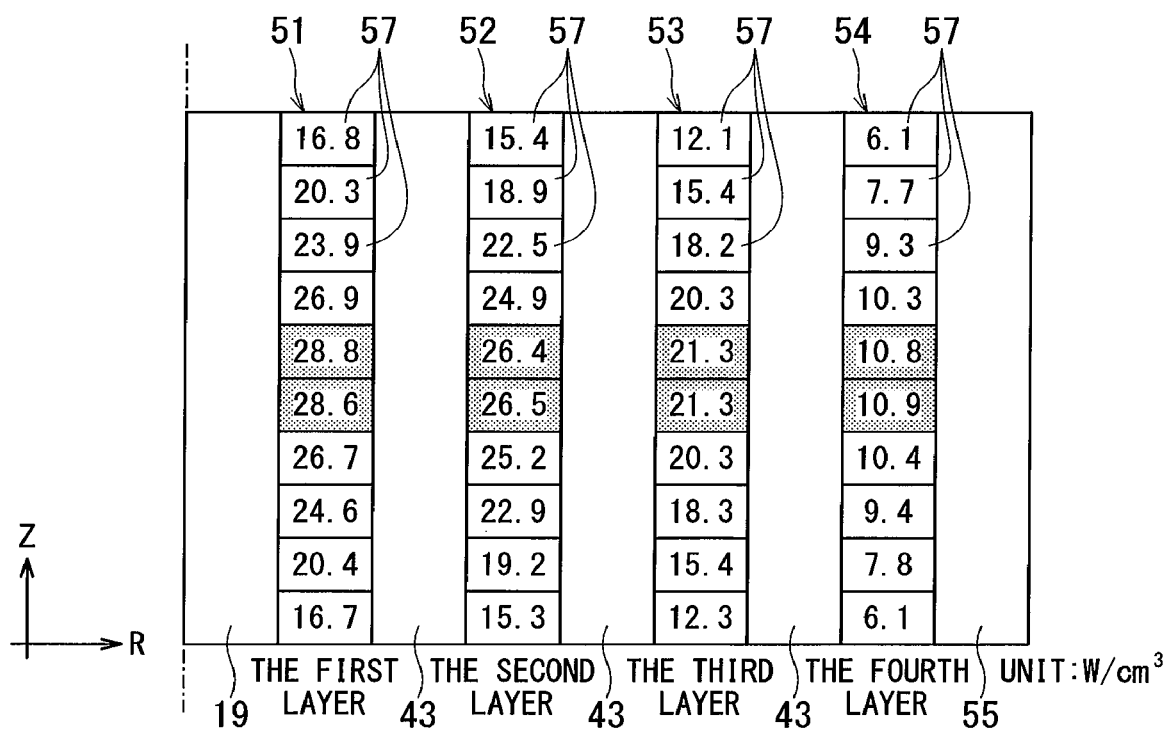
FIG. 15 is a schematic view illustrating amount of energy generated by the second fuel in each section when assuming that the content of the second fuel in each section is equal in an embodiment.

FIG. 14 indicates heat generated in the first fuel 15 in each section 57 when the fissile material concentration in the first fuel 15 in each section 57 is the same with the other sections 57. As shown in FIG. 14, the fissile material concentration in the first fuel 15 in every section 57 is 20%. FIG. 15 indicates heat generated in the first fuel 16 in each section 57 when the fissile material concentration in the first fuel 16 in each section 57 is the same with the other sections 57. As shown in FIG. 15, the fissile material concentration in the first fuel 16 in every section 57 is 15%.

As shown in FIG. 14 and FIG. 15, heat in the middle in the third direction in each layer 51-54, the shaded parts in FIG. 14 and FIG. 15, is higher than in the other parts. Especially, heat generated in the center of the core 32 in the third direction and the second direction is the highest in the core 32. Heat distribution of the core 32 is a cosine distribution centered on the center of the core 32. Thereby, the temperature on the center of the core 32 is much higher than in the other parts.

As shown in FIG. 12, the section 57 generating the most heat in the second layer 52 does not overlap the section 57 generating the most heat in the third layer 53 in the second direction. The section 57 generating the most heat in the third layer 53 does not overlap the section 57 generating the most heat in the fourth layer 54 in the second direction. These arrangements prevent the core 32 from increasing local temperature differences.

As shown in FIG. 13, the section 57 generating the most heat in the first layer 51 does not overlap the section 57 generating the most heat in the second layer 52 in the second direction. The section 57 generating the most heat in the second layer 52 does not overlap the section 57 generating the most heat in the third layer 53 in the second direction. The section 57 generating the most heat in the third layer 53 does not overlap the section 57 generating the most heat in the fourth layer 54 in the second direction. These arrangements prevent the core 32 from increasing local temperature differences.

Figure 16:
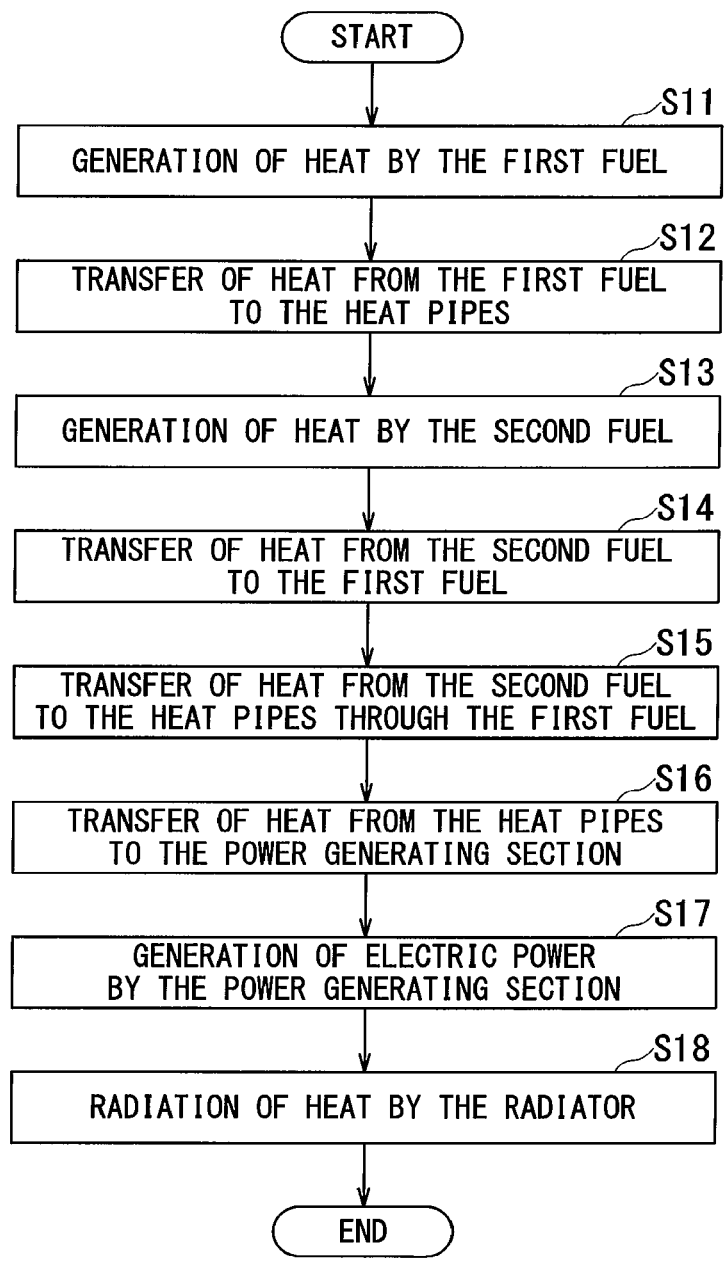
FIG. 16 is a flowchart of a method of heat transfer from inside of a core of a nuclear reactor to outside of the core in an embodiment.

A method of heat transferring from inside of the core 32 to outside of the core 32 is described below. FIG. 16 is a flowchart of the method. In the flow chart, for example, "step 11" is written as "S11".

At first, the first fuel 15 generates heat in S11. Heat generated in the first fuel 15 is transferred to the heat pipes 3 directly at S12 as a first transferring operation.

The second fuel 16 generates heat in S13. Heat generated in the second fuel 16 is transferred to the first fuel 15 at S14. Heat generated in the second fuel 16 is transferred to the heat pipe 3 through the first fuel 15 at S15 as the second transferring operation.

Heat transferred to the heat pipe 3 is transferred to the power generating section 5 at S16 as a transferring operation. The power generating section 5 generates electric power from heat from the heat pipe 3 at S17. Excess heat after S17 is transferred to the radiator 6 to be released to the atmosphere at S18.

Although some embodiments have been described, these embodiments are presented by way of examples and are not intended to limit the scope of the embodiments. These novel embodiments can be carried out in other various forms, and various omissions, replacements, and modifications can be made thereto without departing from the spirit thereof. These embodiments and their variations shall be included in the scope and spirit of the inventions, and also in the range of inventions and its equivalents recited in the claims of the patent. For example, the metal foil 24 may cover the heat pipes 3. The second heat conductor 44 and the third heat conductor 45 may be arranged into any of the cores 32 described in this specification.

The heat pipe 3 is not limited to having liquid inside. A heat pipe 3 that does not have an inside cavity may be used. Heat pumps may be used instead of the heat pipes 3.

The first direction, the second direction, and the third direction may be the X axis, Y axis and Z axis, respectively. The first direction, the second direction, and the third direction may be the circumferential direction, the radial direction, and the axial direction of the cylinder, respectively. The section perpendicular to the central axis of the core 32 is not limited to a circle. The section perpendicular to the central axis of the core 32 may be an ellipse or oval.

Obviously, numerous modifications and variations of the embodiments are possible in light of the above teachings. It is therefore to be understood that within the scope of the appended claims, the embodiments may be practiced otherwise than as specifically described herein.

The invention claimed is:

1. A nuclear device, comprising:
   a plurality of heat pipes;
   a first fuel configured to surround respective of the plurality of heat pipes coaxially with respect to a central axis of each of the respective heat pipes, the first fuel containing a fissile material at a first enrichment level;
   a second fuel configured to directly abut the first fuel on the outside of the first fuel and farther than the first fuel from the respective heat pipes surrounded by the first fuel, the second fuel containing the fissile material at a second enrichment level less than the first enrichment level; and
   a core including the heat pipes arranged in parallel with each other.

2. The nuclear device according to claim 1, wherein a enrichment level of the fissile material in a first area is greater than that in a second area, and a heat transferred from the second area to the heat pipes is less than the heat transferred from the first area to the heat pipes.

3. The nuclear device according to claim 2, wherein the first area contains more heat pipes than the second area per unit area in a cross section of the core perpendicular to a central axis of the heat pipe.

4. The nuclear device according to claim 1, further comprising:
   a first layer that includes the heat pipes arranged in parallel to a central axis of each heat pipe with each first fuel surrounding respective heat pipes surrounded by second fuel;
   a first heat conductor along a side surface of the first layer and parallel to the central axis, thermal conductivity of the first heat conductor being greater than that of the second fuel.

5. The nuclear device according to claim 4, wherein the first heat conductor contains beryllium.

6. The nuclear device according to claim 4, further comprising:
   a layer that includes heat pipes arranged next to each other and in parallel to the central axis of each heat pipe, the second fuel configured to surround the first fuel surrounding respective of the heat pipes next to each other; and
   a second heat conductor disposed in the second fuel.

7. The nuclear device according to claim 1, further comprising:
   two overlapping layers, each layer including heat pipes arranged next to each other in parallel to a central axis of each heat pipe, the second fuel configured to surround the first fuel surrounding respective of the heat pipes next to each other; and a heat conductor connecting the two overlapping layers, wherein a first end of the heat conductor is closer to the heat pipe than a second end.

8. The nuclear device according to claim 1, further comprising:

a first layer that includes heat pipes arranged in parallel to a central axis of each heat pipe, the second fuel configured to surround the first fuel surrounding the heat pipes of the first layer;

a second layer that includes heat pipes arranged in parallel to the central axis of each heat pipe, the second fuel configured to surround the first fuel surrounding respective of the heat pipes of the second layer;

wherein a heat pipe of the second layer is located between two heat pipes next to each other in the first layer when viewed in a direction parallel to the central axis of each heat pipe.

9. The nuclear device according to claim 1, further comprising a metal layer between the heat pipes and the first fuel, including a metal, wherein a melting point of the metal is such that the metal layer is solid at a temperature before the nuclear reactor starts operating, and melts at a temperature after the nuclear reactor starts operating.

10. The nuclear device according to claim 1, wherein the core includes a plurality of cylinders arranged concentrically, wherein each of the cylinders is made of a layer including heat pipes arranged next to each other in parallel to a central axis of each of the heat pipes, the first fuel surrounding the heat pipes arranged next to each other, and the second fuel surrounding the first fuel which surrounds the heat pipes.

11. The nuclear device according to claim 10, wherein the enrichment level of the fissile material in the core differs along the axis of each heat pipe.

12. The nuclear device according to claim 10, wherein the core includes multiple sections arranged in the central axis direction of the core, wherein the enrichment level of the fissile material in each section varies according to a position of the section.

13. The nuclear device according to claim 10, wherein a point outputting a maximum heat in one layer does not overlap a point outputting a maximum heat in a next adjacent layer.

14. The nuclear device according to claim 10, wherein the enrichment level of the fissile material in the core differs in a radial direction in a cross section of the core perpendicular to the central axis of the heat pipes.

15. The nuclear device according to claim 14, further comprising a control rod arranged in a central part of the core, wherein the enrichment levels of the fissile material in the center part of the core, adjacent a side surface of the core parallel to a central axis of the core, and in a at a half point of a length of the core parallel to the center axis, are lower than that of other parts in the core.

* * * * *